United States Patent [19]

Miksitz

[11] 4,015,747

[45] * Apr. 5, 1977

[54] GRAVITY DISCHARGE APPARATUS

[75] Inventor: Frank J. Miksitz, Phillipsburg, N.J.

[73] Assignee: Universal Feeders, Inc., Bethlehem, Pa.

[ * ] Notice: The portion of the term of this patent subsequent to May 7, 1991, has been disclaimed.

[22] Filed: Mar. 31, 1975

[21] Appl. No.: 563,453

Related U.S. Application Data

[63] Continuation-in-part of Ser. No. 467,558, May 6, 1974, Pat. No. 3,874,566, which is a continuation-in-part of Ser. No. 216,105, Jan. 7, 1972, Pat. No. 3,809,286.

[52] U.S. Cl. .............................. 222/1; 214/17 D; 222/136; 222/404
[51] Int. Cl.$^2$ ........................................ B65G 65/48
[58] Field of Search ............. 214/17 D; 222/136, 1, 222/404, 410, 411; 34/168

[56] References Cited

UNITED STATES PATENTS

| 900,227 | 10/1908 | Svenson | 222/136 X |
| 3,403,895 | 10/1968 | Hatfield et al. | 34/168 |
| 3,613,953 | 10/1971 | Paules | 222/56 |
| 3,809,286 | 5/1974 | Miksitz | 222/1 |

Primary Examiner—Robert B. Reeves
Assistant Examiner—John P. Shannon
Attorney, Agent, or Firm—Cushman, Darby & Cushman

[57] ABSTRACT

Apparatus and methods for effecting gravity-assisted flow of granular material from a chamber through an aperture in the bottom wall thereof include an annular horizontal plate orbiting in its plane at a location above the bottom wall in a manner to cause flow of the material toward and through the aperture. The direction of orbital movement reverses periodically to prevent accumulation of the granular material between the plate and the wall. Partitions above the plate divide the granular material into portions each of which is engaged by a part of the plate during each orbit whereby the extent of engagement between the plate and each portion determines the relative amount of that portion being fed.

4 Claims, 6 Drawing Figures

GRAVITY DISCHARGE APPARATUS

RELATED APPLICATION

This is a continuation-in-part of application Ser. No. 467,558 filed May 6, 1974, now U.S. Pat. No. 3,874,566, as a continuation-in-part of Ser. No. 216,105 filed Jan. 7, 1972, now U.S. Pat. No. 3,809,286. The subject matter of both applications is incorporated herein by reference.

The prior applications disclose an apparatus in which the feeding or discharging of granular material from a mass thereof is effected and closely controlled by a special arrangement of a centrally apertured horizontal feed plate disposed below a fixed shroud or baffle located within the mass of material. The disposition of the shroud is such that the granular material does not flow spontaneously by gravity through the apertured feed plate when the latter is stationary. However, the granular material does flow spontaneously to an extent into the periphery of the space directly below the shroud where it comes to rest in the form of an annular mass of material of which at least a portion resides on the upper surface of the plate. Thereafter, the plate is driven in an orbital path about a vertical axis with the result that granular material on the plate is carried inwardly with respect to the vertical axis of the shroud. As this occurs an additional quantity of material flows by gravity from the main mass into the space formerly occupied by the displaced quantity thereby preventing reverse displacement of the initially displaced quantity during continued orbital movement. In one form of the apparatus, the feed plate moves relative to the initially displaced material so that an edge portion of the aperture in the plate moves under this material which then passes through the aperture by gravity. The overall result is that granular material is continuously fed downwardly through the feed plate along a path which moves in a circle, the flow of material being proportional to the speed of the plate.

In another form of apparatus it is necessary for the feed plate to reach out beyond the periphery of the shroud in order for it to perform a proper feeding or discharging operation. This may be necessary, for example, if the granular material has little or no tendency to flow inwardly under the shroud. This condition may be present if the material is finely-divided and non-free-flowing as may be the case with especially cohesive or sticky substances. The condition may also result if the material contains lumps which are of large size relative to the vertical distance between the shroud and the feed plate. For example, some powders which are readily free-flowing once they are put in motion tend to form arches within the mass of powder when a portion of the material is removed by gravity through a feed or discharge aperture with the result that flow through the aperture will be intermittent or cease altogether. In the case of chunky material containing lumps of irregular size and shape, the material may wedge between the shroud and the feed plate and impede or prevent flow of the material.

In yet another form of the apparatus there is provided a feed plate having a central hole which is larger than a feed hole in a horizontal shelf or wall over which the feed plate is mounted. In this construction, orbital movement of the feed plate displaces the granular material inwardly toward its center in the manner described above but instead of falling by gravity through the hole in the feed plate the material is first deposited on the shelf and is subsequently pushed over the edge of the feed hole in the latter by continued orbital movement of the feed plate. This arrangement permits a smaller area of contact between the lower surface of the feed plate and the shelf and thereby reduces friction at this location. The same is true with respect to reduced friction between the upper surface of the feed plate and the mass of granular material. In addition, the feed plate tends to remain buried by the granular material, and this is advantageous in protecting the feed plate from any corrosive atmosphere which may be present. This type of feed plate may have a diameter either greater or smaller than the shroud.

SUMMARY OF THE INVENTION

One feature of the present invention is the provision of partitions above a gravity assisted feeding device such as the orbital plate described above for the purpose of making different granular materials available to the feeding device. This permits preselected proportions of different components to be fed.

According to another feature of the present invention accumulation of particulate material under the feed plate is prevented. With some materials such as coal it has been found that fine particles of the material tend to lodge between the lower surface of the feed plate and the upper surface of the bottom wall or shelf of the bin or other container. As the fine particles accumulate there is a tendency for the feed plate to be forced upwardly with the result that the drive connection between motor and the feed may bind. This accumulation is generally less likely to occur when the feed plate is free to roll about its own axis during its orbital movement. When little or no rolling movement is permitted the tendency is more pronounced. In any event periodic reversal of the direction of movement of the plate has the effect of reducing or preventing the tendency of the feed plate to move upwardly. It has been found that this tendency is further reduced when the reversal feature is used for a feed plate which is provided with studs or other projections on its lower surface. In this construction it is thought that the particulate material packs between the studs and forms a scrubbing surface which tends to prevent further accumulation of particulate material. In any event the use of studs or their equivalent together with a periodic drive reversal in a machine where only partial rolling of the feed plate occurs has been found to prevent binding of the feed plate drive under operating conditions where binding did occur with a smooth feed plate operated in only one direction.

It is a further feature of the invention to provide a special purpose granular material feeding device which does not require the presence of a shroud above an apertured orbital feed plate. This type of apparatus is suitable for feeding granular material which has such a strong tendency to form an arch above an aperture that it will not flow spontaneously or uniformly through the aperture. Orbital movement of the feed plate continuously breaks the arch and permits gravity flow of the material.

Throughout this description orbital movement of a feed plate means that the plate moves in generally a circular path either with or without rotation about its own axis. When there is no rotation of the plate about its own axis, all points on the plate move in circular paths of the same radius which is small compared to the radius of the plate. When the plate also rotates about its own axis, the plate moves generally as if its circumference were rolling along the inside of a ring of slightly greater diameter than the plate. These are the same movements disclosed in the aforesaid U.S. Pat. No. 3,809,286. It is immaterial to the invention what form of drive means is employed to effect either form of movement.

By granular material is meant any solid or semi-solid material in the form of discrete particles, grains or lumps without regard to size or density so long as the material can be made to flow downwardly by gravity when acted on by the feed plate. The term encompasses all types of finely divided material including ground cement, as well as larger particulate matter, such as sand, stone and coal.

DETAILED DESCRIPTION OF EMBODIMENTS

Figure 1:
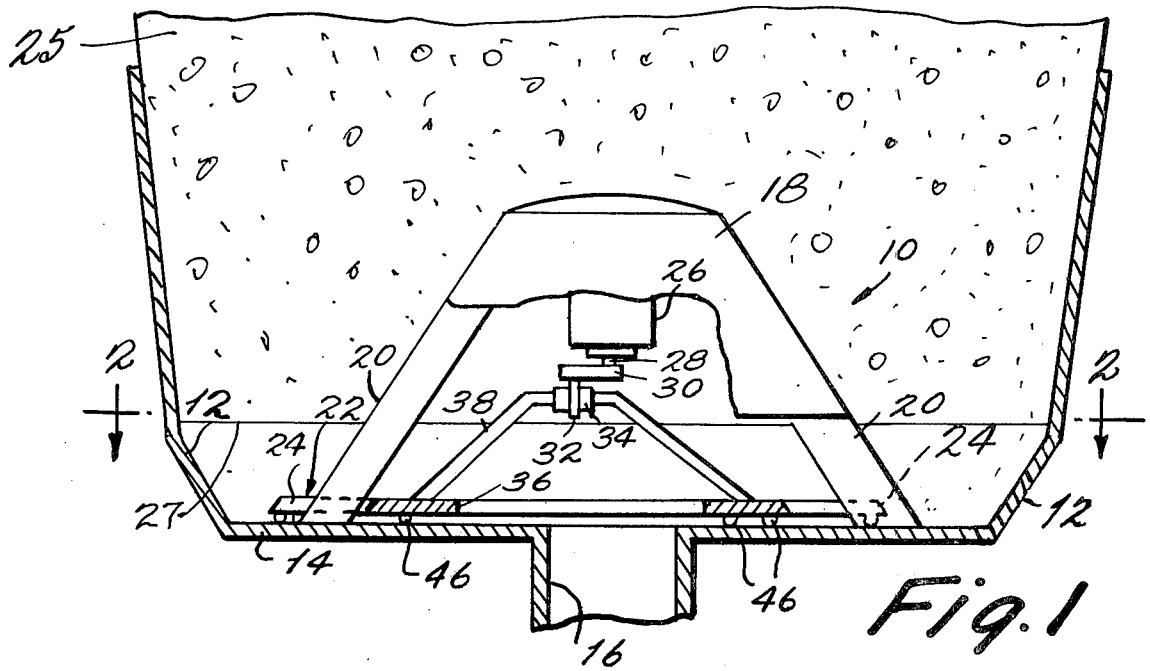
Figure 2:
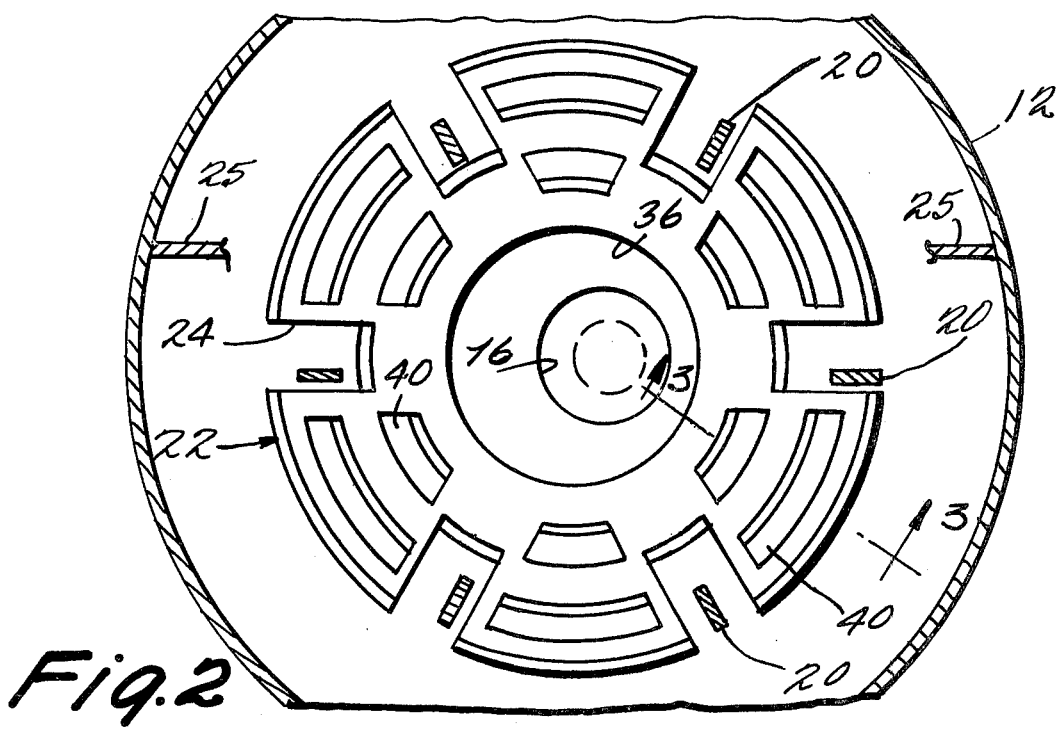
Figure 3:
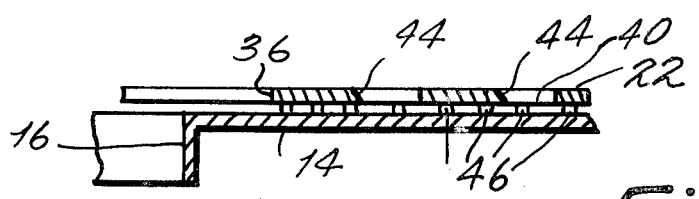
Figure 4:
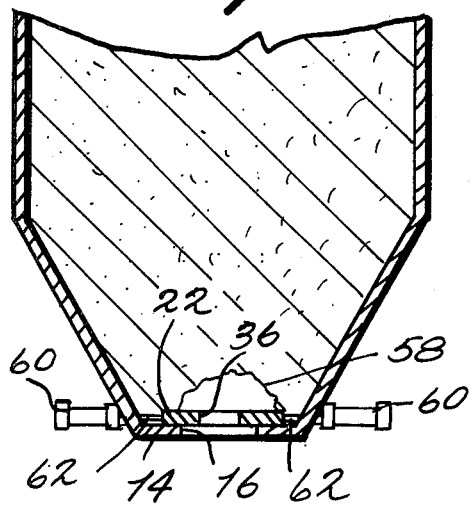
Figure 5:
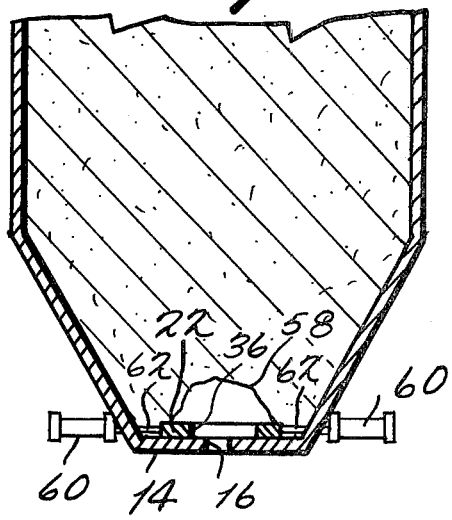
Figure 6:
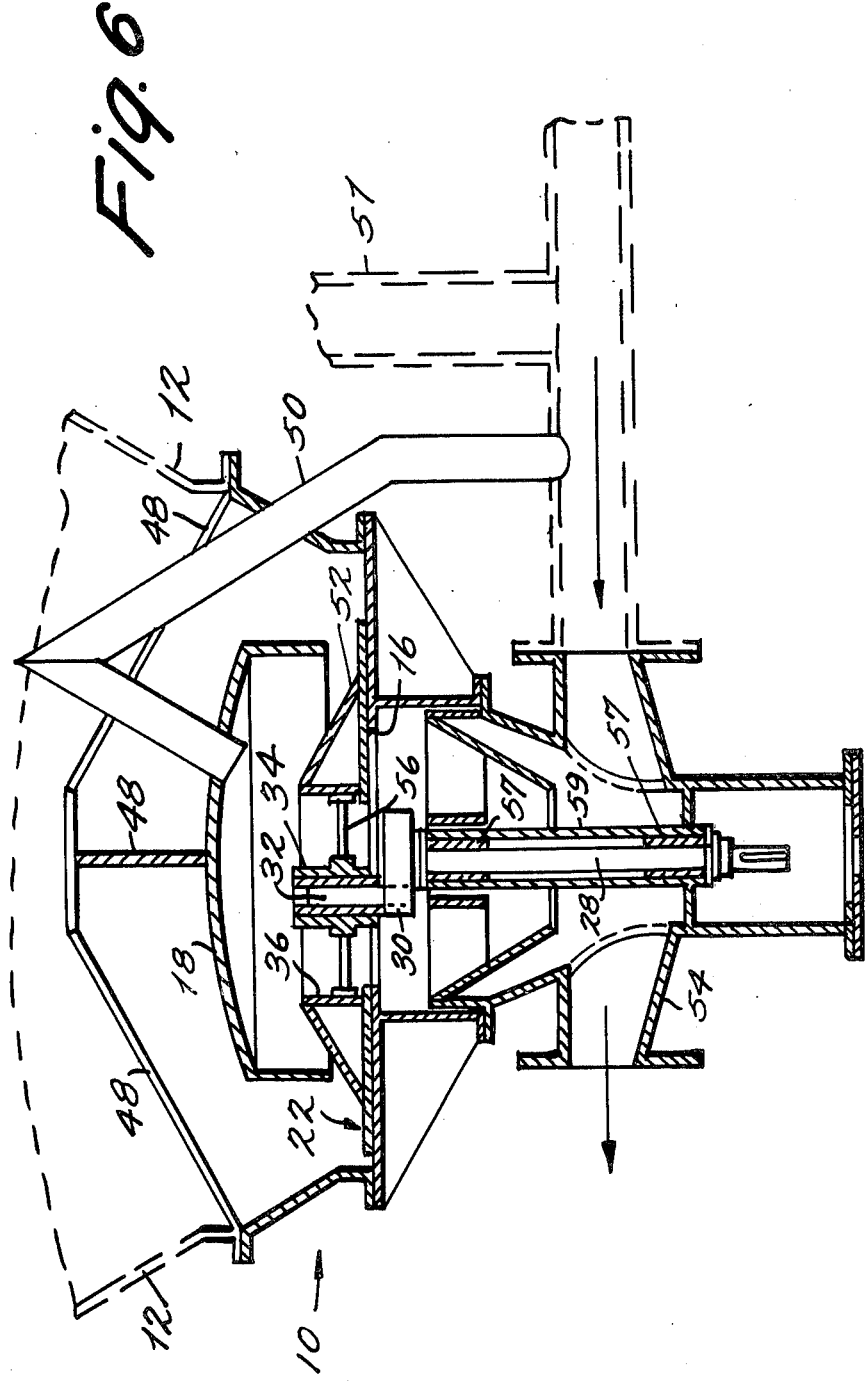

The invention will be further understood from the following more detailed description taken with the drawings in which:

FIG. 1 is a vertical sectional view of feed apparatus embodying an orbital feed plate and a partition for guiding different granular materials to the feed plate;

FIGS. 2 and 3 are sectional views taken on the lines 2—2 and 3—3, respectively, of FIG. 1;

FIGS. 4 and 5 are vertical sectional views of feed apparatus embodying special-purpose orbital feed plates which operate without shrouds; and FIG. 6 is a vertical sectional view of a feed apparatus embodying a special-purpose feed plate which includes an inclined annular dam on its upper surface.

Referring to FIGS. 1, 2 and 3, there is shown a feed apparatus 10 located in the lower tapered end of a bin, silo or other vessel, defined by inclined side walls 12 and a horizontal shelf 14 or bottom wall, the latter including a circular discharge aperture 16. The feed apparatus 10 includes a generally frusto-conical shroud 18 which is supported by a plurality of legs 20 in a postion above and axially aligned with the aperture 16. A generally circular feed plate 22 of greater diameter than the shroud 18 is slidably supported on the bottom wall 14 below the shroud 18. The periphery of the feed plate 22 is notched as shown at 24 to receive the legs 20 which support the shroud 18. Alternatively, the legs 20 may be disposed in the slots 40 described hereinafter, so as to permit more rotation of the plate 22 about its own axis than is permitted by the notches 24. Alternatively, if free rotation of the plate is desired, the shroud 18 may be supported from above or from the side walls 12.

A vertical partition 25 extends across the bin at a location such that its plane will be intersected by a portion of the plate 22 during orbital movement of the latter. The lower edge 27 of the partition 25 terminates at about the level of the lower edge of the shroud 18. The purpose of the partition 25 is to divide the interior of the bin into two portions so that when different materials are placed in the two portions each material will be fed by the plate 22 in proportion to the area exposed to the upper surface of the plate 22. In the illustrated embodiment the partition 25 is offset slightly from the diameter of the bin with the result that slightly more of one material will be fed. Obviously the interior of the bin can be divided into any desired number of portions by different arrangements of partitions. The partitions need not be vertical so long as they guide the different materials to different locations on the orbital path of the plate 22.

The feed plate 22 is driven with orbital movement by any sitable means such as a reversible electric motor 26 supported by the shroud 18 in a position such that the motor shaft 28 is coaxial with the discharge aperture 16. A horizontal crank arm 30 is fixed to the motor shaft 28 and carries at its outer end a fixed depending stub shaft 32 which is parallel to the motor shaft 28. The shaft 32 fits into a bearing 34 which is disposed coaxially above a centrally located circular feed aperture 36 in the feed plate 22. The bearing 34 is fixed with respect to the feed plate by legs 38 which are rigidly connected to the upper surface of the feed plate 22 and to the casing of the bearing.

Some granular materials such as large chunks of coal may tend to cause binding of the plate 22. To prevent binding the motor 26 should be reversed periodically. Reversal may be made at any intervals found to be suitable for the particular material being fed. Intervals of 1 mintue may be appropriate for some materials while intervals of several hours or even a day or more may be appropriate for other materials.

To reduce friction between the upper surface of the feed plate 22 and the granular material and between the lower surface of the plate 22 and the shelf 14, the plate 22 may be slotted as shown at 40 to reduce the area of contact. However, since the feeding function of the plate 22 depends on friction between the plate 22 and the granular material, the design of the plate 22 will vary with the type of material being handled. In some instances, it may be desirable to increase friction by providing a plurality of small upwardly directed cleats or the like (not shown) on the upper surface of the plate 22 near the periphery thereof. To reduce the power required to drive the plate 22 into the granular material the outwardly facing edges of the plate 22 and of the slots 40 should be chamfered as shown at 42 and 44, respectively. However, the inwardly facing edges of the feed aperture 16 and the slots 40 should be vertical to aid in gripping the granular material. The peripheral edge of the plate 22 may be smoothly circular, as shown, or it may be uneven as by the provision of horizontal tooth-like projections.

The lower surface of the feed plate 22 may be flat or as illustrated in FIGS. 1 and 3, it may be provided with a plurality of short stud-like elements 46 which engage the shelf 14 and thereby support the plate 22 slightly above the shelf 14. The illustrated construction is effective in preventing the build-up of pulverized material between the plate 22 and the shelf 14. It has been found, for example, that in feeding coal the finer particles tend to accumulate under the plate 22 and force it upwardly with resulting misalignment and damage to the elements of the drive system, if the stud-like elements or their equivalent are not present.

In operation of the apparatus of FIGS. 1, 2 and 3, the crank arm 30 which is fixed to the motor shaft 28 is driven by the latter at a low rpm to impart orbital movement of the feed plate 22 through the interaction of the off-set stud shaft 32 on the bearing 34. Frictional forces on the feed plate 22 tend to cause the latter to roll or rotate about its own axis, that is, the axis of the bearing 34. In the illustrated embodiment this rotation is restricted by engagement of the walls of the notches 24 with the legs 20, but as described previously greater freedom of rotation can be provided if desired. The orbital movement causes a peripheral portion of the feed plate 22 to reach out into the granular material beyond the shroud 18 and to then move inwardly to drag granular material to a position under the shroud 18. The material may tend to form an arch from the base of the shroud to the bottom of the bin, but the feed plate 22 breaks the heel of the arch. The plate 22 may of course be of smaller diameter and/or travel in a smaller orbit so as to always remain wholly under its shroud. In the latter case the granular material is relatively unconsolidated for the reason that it has flowed by gravity into the form of an annular mass disposed under the shroud. As pointed out previously, some granular materials which are free-flowing when agitated are sufficiently cohesive that they tend to form a dome-like arch extending across an aperture through which they are flowing by gravity. The extended form of feed plate 22 is preferred for feeding these materials because it continuously and progressively breaks the arch as it penetrates into the granular material. During continued orbital movement of the feed plate 22 the granular material which has been dragged under the shroud 18 moves across the upper surface of the feed plate 22, is deposited on the shelf 14 and is then pushed over the edge of the discharge aperture 16 in the latter in the form of a continuous stream. The locus of the path of the falling material continuously moves around the periphery of the aperture 16, as described previously. The mass rate of flow through the aperture for a given set of conditions varies only with the speed of the feed plate 22.

If the discharge aperture 16 in the shelf 14 were larger than the feed aperture 36 in the feed plate 22, the granular material would be fed continuously through the aperture 36 in a path moving around the periphery of the latter. In the illustrated embodiment, the feed plate 22 has been designed purposely with a relatively large feed aperture 36 in order to reduce friction by reducing the distance which the granular material must move across the feed plate 22. The smaller annular area of the feed plate 22 will normally be covered with the granular material and this is beneficial in shielding the feed plate 22 from any high temperature or corrosive atmosphere which may be present.

As described above, the partition 25 divides the interior of the bin into two portions each of which is penetrated by at least a part of the feed plate 22 during each orbit. If different granular materials are placed in each portion each material will be fed in proportion to the area of contact between the upper surface of the plate 22 and that material.

FIGS. 4 and 5 illustrate special-purpose feed apparatus in which orbital feed plates 22 operate without the use of shrouds. In these embodiments the granular material is so cohesive as to be essentially non-flowable because of the formation of a dome-like arch 58 above the discharge aperture 16. Orbital movement of the feed plate 22 continuously and progressively breaks the heel of the arch and permits the material to flow through the feed aperture 36 and the discharge aperture 16. In FIG. 4 the feed aperture 36 has a lesser diameter than the discharge aperture 16, and in FIG. 5 it has a greater diameter. The drive system for the plates 22 may include sequentially operated hydraulic cylinders 60, the piston rods of which engage the periphery of the respective plate 22. In a further modification (not shown) the plates 22 can be imperforate or perforated with a plurality of small holes and disposed somewhat above the shelf 14. With this arrangement orbital movement of the plate 22 breaks the arch 58 and causes the material to flow to the discharge aperture through the annular space existing between the plate 22 and the shelf.

FIG. 6 illustrates a feed apparatus 10 which is especially adapted for feeding granulated or powdered material into, for example, a pneumatic conveyor conduit. In this embodiment, the shroud 18 is shown as being supported from above by suitable brace members 48 attached to the side walls 12 of the bin. In feeding a pneumatic conveyor conduit the material which spontaneously flows inwardly under the shroud may become aerated or partially fluidized by adventitious pressure fluctuations in the system; in such instance the aerated material might flow through the discharge aperture 16 at irregular or uncontrolled rates if not prevented from doing so. The feed plate 22 is constructed with an annular dam 52 which surrounds the feed aperture 36 and which is inclined downwardly and radially outwardly as shown. The upper edge of the dam 52 is above the lower edge of the shroud and thereby blocks the spontaneous or uncontrolled flow of powdered material into the feed aperture 36. In some cases the dam may extend upwardly to a point below the lower edge of the shroud. In either case, upon orbital movement of the feed plate 22, the material will be urged over the dam 52 so as to pass through the apertures 36 and 16 into a pneumatic conveyor conduit 54 through which a stream of air is passing in a leftward direction.

The conveying air passing the point of discharge can cause a lowered pressure at that point due to a siphoning effect of the high velocity air stream. This may cause pressure distrubances near the feed plate 22 with resultant fluidization of the material. To equalize pressure and prevent such pressure distrubances a conduit can connect the region under the shroud to the pneumatic conveying line in order to maintain the pressures about equal at these two locations. Such a pressure-equalization conduit should be constructed essentially vertically thereby avoiding horizontal sections where granular material may tend to build up. As shown, a conduit 50 leads from the upstream portion of the conveyor conduit 54 into the area just below the upper end of the shroud. A second conduit 51 terminates in the top of the bin. A secondary benefit of the conduits 50 and 51 is momentary aeration caused by pressure fluctuations which would promote flow and minimize the possibility of hang-up of material.

In many cases in which the present invention is used to feed cohesive or non-free-flowing material it may often be desirable to include in the bin or hopper aeration nozzles or jets to inject air or other gas into the mass of material, thereby rendering it free flowing; this may also be accomplished by causing the bin or hopper, or even the shroud of the feeder, to vibrate at a suitable frequency. Such gas injection or vibration may cause the material to flow through the discharge aperture 16 at irregular and uncontrolled rates. In such instances an annular dam 52 on feed plate 22 may be incorporated to block the spontaneous or uncontrolled flow of granular or powdered material into the feed aperture 36 or the discharge aperture 16.

In the FIG. 6 embodiment the drive system is located below the feed plate 22. The bearing 34 is disposed centrally within the feed aperture 36 and is connected to the feed plate 22 by a suitable spider 56. The drive shaft 28 is supported by bearings 57 within a sleeve 59.

What is claimed is:

1. A method for discharging granular material by gravity assist from an upper zone containing an annular mass of the granular material which is supported on a bottom wall of the zone and which is disposed below a shroud, said bottom wall having a discharge opening therein located below the shroud, said method comprising disposing a horizontal annular plate below the shroud and above said bottom wall in a position such that at least a portion of the granular material in the annular mass thereof resides on the upper surface of the plate, orbiting the plate in a horizontal plane relative to said discharge opening in a manner to urge granular material from the annular mass thereof inwardly to the periphery of the aperture in the plate and thereafter through the discharge opening along a path which moves in a horizontal plane around the periphery of the aperture, and periodically reversing the direction of the orbit of the plate.

2. A method as in claim 1 wherein the granular material is deposited on the upper surface of said bottom wall exposed within the aperture in said plate and is thereafter pushed over the edge of the discharge opening by the movement of said plate.

3. Apparatus for conveying granular material by gravity assist from an upper zone containing a mass of the material downwardly through a vertically facing discharge opening in a horizontal wall into a lower zone at a controlled flow rate comprising: a shroud which is symmetrical about a vertical axis passing through the shroud and having its lower end disposed within the mass of material and directly above the vertically facing discharge opening; a horizontal annular plate having an aperture therethrough located directly below the lower end of the shroud and above the discharge opening, said annular plate engaging and being supported by said horizontal wall; means for orbiting said plate relative to said discharge opening about the vertical axis of the fixed shroud so that granular material is urged inwardly from the mass of material and over the edge of the aperture in said annular plate along a path which continuously moves around the periphery of the aperture; and partition means dividing the mass of material into at least two portions each of which is engaged by at least a part of said plate during each orbit thereof, the extent of engagement between said plate and each portion determining the relative amount of that portion being fed.

4. A method of feeding cohesive or non-free flowing granular material by gravity assist from a chamber containing a mass of said material downwardly through an aperture in a stationary wall which forms the bottom of said chamber, the non-free flowing nature of the material resulting in the formation of a continuous domed arch above and spanning the aperture and preventing the material from flowing spontaneously or uniformly through the aperture, said method comprising providing a horizontal plate above the aperture and at the location of the arch and imparting orbital movement to the plate in a horizontal plane in a manner such that a peripheral portion of the plate penetrates and breaks the arch so that the granular material flows radially inwardly with respect to the aperture and then through the aperture.

* * * * *